US007099474B1

(12) United States Patent
Lidén et al.

(10) Patent No.: US 7,099,474 B1
(45) **Date of Patent: *Aug. 29, 2006**

(54) KEY AND LOCK DEVICE

(75) Inventors: Inge Lidén, Eskilstuna (SE); Rolf Norberg, Täby (SE); Björn Magnusson, Eskilstuna (SE); Johan Warnström, Järna (SE); Reijo Hakkarainen, Joensuu (FI); Hannu Sivonen, Marjovaara (FI); Gudrun Brennecke, Berlin (DE); Christophe Chanel, Berlin (DE); Jens Gürtler, Rangsdorf (DE); Jürgen Krühn, Berlin (DE); Alain Varenne, Vendat (FR); J M Thomas, Woignarue (FR); Lance Schoell, Roanoke, VA (US); Gilbert Andre, Torvilliers (FR); Christian Darmanin, Troyes (FR); Arnaud Lefebvre, Troyes (FR); Walter Hammer, Enges (CH); Claude-Eric Jaquet, Les Joux-Derriere (CH); Nicolas Peguiron, Le Locle (CH)

(73) Assignee: Assa Abby AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/565,495

(22) Filed: May 5, 2000

(30) Foreign Application Priority Data

| | | | |
|---|---|---|---|
| May 6, 1999 | (SE) | .................................... | 9901643 |
| Mar. 10, 2000 | (SE) | .................................... | 0000794 |
| Mar. 10, 2000 | (SE) | .................................... | 0000795 |

(51) Int. Cl.
*G06K 5/00* (2006.01)
*B60R 25/10* (2006.01)

(52) U.S. Cl. ........................ 380/262; 340/5.1; 340/5.6; 340/5.7; 340/5.74; 340/500; 340/825.31; 235/382; 713/168; 713/171; 713/172; 713/173

(58) Field of Classification Search ................ 380/262; 340/5.1, 5.6, 5.7, 5.74, 500, 825.31; 235/382; 713/168, 171–173
See application file for complete search history.

(56) References Cited

U.S. PATENT DOCUMENTS

| | | | | |
|---|---|---|---|---|
| 4,509,093 | A * | 4/1985 | Stellberger | 340/5.26 |
| 4,944,008 | A | 7/1990 | Piosenka et al. | |
| 4,968,973 | A * | 11/1990 | Rowland | 340/571 |
| 5,025,426 | A | 6/1991 | Blumberg et al. | |
| 5,107,258 | A | 4/1992 | Soum | |
| 5,170,431 | A | 12/1992 | Dawson et al. | |
| 5,552,777 | A * | 9/1996 | Gokcebay et al. | 340/5.54 |
| 5,600,723 | A * | 2/1997 | Woodall et al. | 713/170 |
| 5,749,253 | A | 5/1998 | Glick et al. | |
| 6,442,525 | B1 * | 8/2002 | Silverbrook et al. | 705/1 |
| 6,822,552 | B1 * | 11/2004 | Liden et al. | 340/5.21 |

FOREIGN PATENT DOCUMENTS

| | | | |
|---|---|---|---|
| EP | 0 253 499 | A2 | 1/1988 |
| EP | 0 401 647 | A1 | 12/1990 |
| EP | 0 816 600 | A2 | 1/1998 |
| GB | 2 309 046 | A | 7/1997 |

* cited by examiner

*Primary Examiner*—Taghi Arani
(74) *Attorney, Agent, or Firm*—Sughrue Mion, PLLC

(57) ABSTRACT

A key and lock device comprises a key having a first electronic circuit and a lock having a second electronic circuit. The key and the lock store secret information, some of which is unique for each device. The key and the lock exchange a random number through connectors and perform a calculation in the respective circuitry based on the random number and secret information. An electrical blocking mechanism is moved to a non-blocking position if a comparison of the calculations in the circuits gives the correct result.

16 Claims, 4 Drawing Sheets

KEY AND LOCK DEVICE

FIELD OF INVENTION

The present invention relates generally to key and lock devices, and more specifically to an electro-mechanical key and lock device and a key device.

BACKGROUND

It is previously known a variety of lock devices that use electronic devices for increasing the security of the lock and for providing effective administration, management, and control of keys and personnel. However, the demand for lock systems with a high level of security and at the same time being easy to administer is constantly increasing.

The UK patent application GB 2 309 046 discloses a lock that sends a random number to a key, which applies a crypto algorithm to the random number and sends a code word back to the lock. In the lock, the code word is compared with a desired code word, which is generated by applying the same crypto algorithm to the random number. An authentication signal is then generated so long as the code word and the desired code word are substantially but not necessarily completely in agreement. The described key and lock system has several limitations and drawbacks. The communication between lock and key is wireless, introducing noise in the transmitted information. Therefore, the level of security is decreased as a certain degree of mismatch between the results calculated in the lock and the key must be allowed. This might be allowed in a car lock application, as is the case here, but not in normal lock applications. Furthermore, the key is limited to the use with one single lock, thus making the system unusable in a master key system.

The European patent application EP 0 816 600 discloses a single key system comprising a lock, keys and a codifier. The lock includes an electronic circuit which stores an access code and identification codes for the keys with specific restrictions. The keys include electronic circuits that store the access codes for one or several keys. However, one drawback with the described single key system is that it is possible to read out or intercept data, lowering the level of security.

SUMMARY OF THE INVENTION

An object of the present invention is to provide an electro-mechanical lock device of the kind initially mentioned wherein the user will not see any difference to the use of a traditional all mechanical lock.

Another object of the invention is to provide a lock device that is more secure and reliable than known locks.

Another object is to provide a lock device wherein the assignment of keys is facilitated.

Another object is to provide for easy adding or deleting of authorization of access to the operation of a cylinder by the key.

Another object is to provide an electro-mechanical lock device with a reliable transmission of data and power between the key and cylinder and with a short time delay for operation of the cylinder.

Still another object is to provide a lock device that enables easy replacement and upgrading from mechanical to electromechanical lock of an existing lock device.

Another object is to provide a lock device wherein the key system is not limited by mechanical restrictions.

The invention is based on the realization that no secret codes are exchanged between a key and a lock but instead a random number generating the necessary information for determining whether a key is authorized. This random number is used together with lock or key identifications in order to achieve a lock and key combination with improved characteristics.

Thus, according to the invention there is provided a key and lock device as defined in claim 1.

According to the invention there is also provided a key device as defined in claim 19.

Further preferred embodiments are defined in the dependent claims.

The invention provides a key and lock device and a key device by means of which at least some of the above problems with prior art are overcome or at least mitigated.

BRIEF DESCRIPTION OF DRAWINGS

The invention is now described, by way of example, with reference to the accompanying drawings, in which.

DETAILED DESCRIPTION OF THE INVENTION

Figure 1:
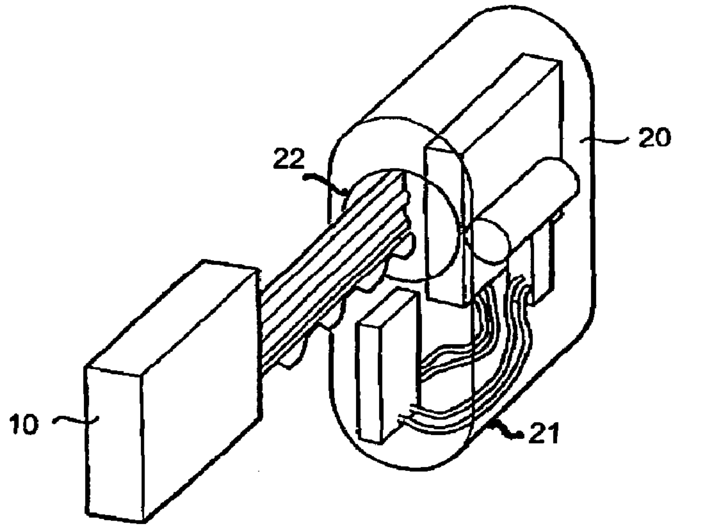
FIG. 1 is an overall view of a lock and a key according to the invention.

In the following a detailed description of the invention will be given. In FIG. 1, a key 10 and a lock 20 are shown. Both these main parts are shaped like known devices. This means that a user familiar with conventional locks will not experience any difficulties using the lock according to the invention. This also means that an existing conventional lock cylinder can be replaced by the lock cylinder shown in FIG. 1. Thus, an upgrading of the conventional, all mechanical lock can take place without encountering any problems.

Preferably, the lock is a "plug and play" cylinder or a "stand alone" cylinder with the possibility to accept keys with the right mechanical and electrical code.

One feature of the lock is that it can exclude keys from a lock electrically. A correct key can rotate the plug as long as it is fully inserted and in both directions as given by the lock case or latch to which the cylinder is attached. Once the key is removed, a new authorization cycle starts when a key is inserted again.

The lock cylinder is made up of a housing 21 and a core or plug 22 provided in a bore in the housing 21, as is conventional. The cylinder also comprises conventional mechanical blocking elements (not shown). An electrical blocking means and an actuator 40 (shown in FIG. 3) are provided in the plug 22, wherein the function of the actuator is to control the blocking means. The function of the mechanical and electrical blocking means is to block the operation of the lock should an inserted key present an incorrect mechanical and/or electrical code.

Thus, the particular user will not see any difference to the use of a traditional mechanical key. He or she inserts his/her key and turns until the lock latch or deadbolt is retracted (or moved to a locked position). The only difference is that there may be a display or other indication on the key that references the power left in the battery to indicate if the battery has been discharged to a level that desires replacement.

The type of mechanical blocking element could be any conventional element, such as a pin, sidebar, ball, and disc or by means of free rotation of the cylinder plug.

The default locking position is always locked (closed). This ensures that there will be no free passage for an unauthorized person in case of e.g. electric failure. The locked position should be mechanically ensured when the key is removed from the cylinder or when it is returned to insertion position for a disc cylinder.

Figure 2A:
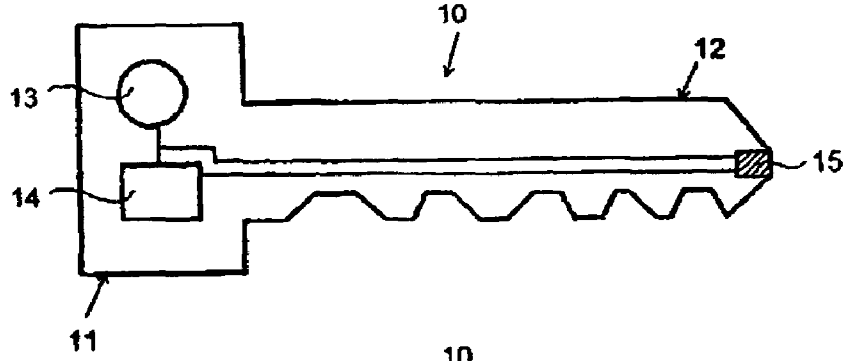
FIG. 2*a* is a side view of a first embodiment of a key according to the invention.

The key 10 comprises a grip part 11 and a bit or blade part 12, see FIG. 2*a*. The grip 11 comprises a battery 13 and electronic circuitry 14 comprising a microprocessor chip with associated memory etc., the function of which will be described later with reference to FIG. 3. The bit part 12 is provided at its outer end with a connector 15 adapted to co-operate with a connector in the lock 20. The electronic circuitry is powered by the battery 13, indicated with an interconnecting line in FIG. 2*a*, and is also connected to the connector 15.

Figure 2B:
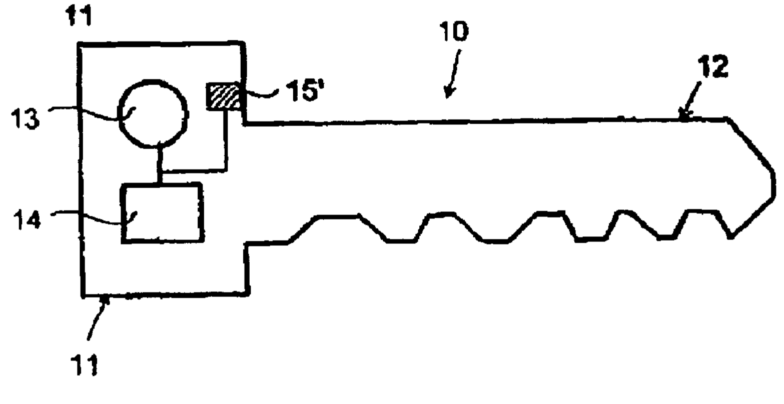
FIG. 2*b* is a side view of a second embodiment of a key according to the invention.

An alternative embodiment of the key according to the invention is disclosed in FIG. 2*b*. Therein, the connector 15 is located on the edge of the grip part 11 to co-operate with a connector on the face of the lock 20. In all other aspects, the connector 15 in FIG. 2*b* functions as the one in FIG. 2*a*.

The battery 13 provided in the key 10 is any one of conventional type available in stores selling cameras and/or watches, in drugstores etc. The battery is held in place by means of a conventional battery holder. In that way, it is easy to replace a used battery. The only tool needed is a coin or the like. In an alternative embodiment, a seal or a high level secure opening is used, where this is preferred.

Replacing the battery will not erase data or affect functions. A clock will, however, need to be set after a battery change. This clock setting is effected by means of e.g. insertion into a key programming unit. When the battery is almost discharged, the user is notified that a battery change is necessary. This is done by means of e.g. an LCD display, a buzzer, or an increasing number of unblocking failures. Chip temperature is used to compensate for decreasing voltage and avoid early battery warning.

The unblocking penalty starts when the electronics detect a too low voltage level at normal temperature. The key will just open every second attempt and successively more seldom. In that way, the user is alerted of the fact, that it is time to replace the battery.

Electronics

The electronic circuitry of the key 10 and the lock 20 will be described in detail in the following.

The electronics are well protected against any form of manipulation, illegal reading or change of information. To this end, precautions have been made to safeguard and isolate all electrical modules from external manipulations, handling, and environmental hazards. For example, the microprocessor has been designed with measures to protect the integrity of the memory on the chip.

The electronics of the key 10 will now be described with reference to FIGS. 2*a*, 2*b* and 3.

Figure 3:
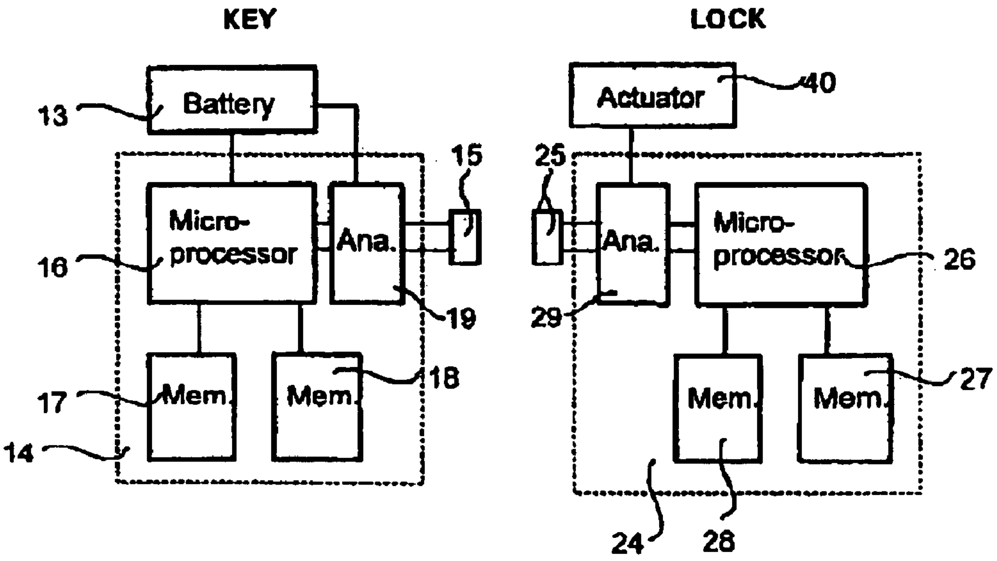
FIG. 3 is a block diagram of the electronic circuitry of the key and lock device according to the invention.

From FIG. 3 is seen that the key electronics includes a microprocessor 16 and associated memory 17 and 18 and an analogue circuit 19. The battery 13 is connected to the microprocessor 16. However, it is also connected to the connector 15, whereby power from the battery in the key can be transferred to the lock electronics.

The microprocessor 16 can be of any conventional type. However, it is preferred that it is a custom-made circuit incorporating the parts necessary to perform the important algorithms discussed below. Also, this further increases the speed by which the authentication procedure is performed, preventing unwanted delays when operating the lock. This encryption algorithm can be implemented totally or partially hardware or software within the microprocessor 16.

There is an analogue part 19 in the key electronics, which acts as an interface to the digital electronics. A corresponding analogue part 29 is provided in the lock, see below. In the lock, the analogue part 29 functions as an interface to the actuator 40.

The analogue parts also perform various additional tasks, such as to detect that a key is in contact with a lock. They also perform a very important security task; they protect the electronics and the actuator against manipulation/opening of the lock or key by electronic attacks, such as high voltage, current, repetitive codes trials, etc. This protection can be archived by a destruction of the analogue part in the key and/or lock and thus guarantees that the actuator does not enter the non-blocking position.

FIG. 3 also shows the memories 17, 18 connected to the microprocessor. The function of the first memory 17 in the key is to store data regarding key ID, lock ID, etc., see below. The second memory 18 is a tamper proof memory protected against external physical attempts to read its content. In that memory 18, all secret information elements, e.g. codes for encryption, are stored. The software could also be stored therein for better security.

For security reasons, all important data that are in the memories 17, 18 are encrypted using the algorithms discussed below. Thus, the data is difficult to interpret in the unlikely case that an unauthorized person has been able to read out the memory contents.

The electronics of the lock 20 is almost identical to that of the key 10 with the exception that there is no battery in the lock and, optionally, there is additional actuator driver circuitry (not shown). There is the connector 25 adapted to co-operate with the connector 15 in order to enable transfer of power and data between the key 10 and the lock 20. The contact point between the connectors 15, 25 is thus used for transfer of both power and data. The key material, being of a suitable metal, serves as ground. The connector 25 is connected to the microprocessor 26 with associated memories 27, 28. The hardware of the microprocessor 26 is identical to that of the microprocessor 16. Thereby, cost savings are achieved and the key and the lock electronics will be easier to program.

One advantage with the key and lock device according to the invention is thus that corresponding chips can be used for key and lock. The microprocessor can operate in different modes, with and without connection to a battery, with and without continuous power, as lock or key, controlling an actuator or not etc, thus reducing costs. In that way, a battery can be provided in the key, in the cylinder or both in the key and in the cylinder.

The electronics refuses entry to everybody if the memories have been tampered with. To restore the status a system key is used together with programming software to reinstall the keys in the cylinder. Status can then be checked with a test box.

The standard function of the actuator is to electrically unblock (open) the blocking mechanism and to mechanically reblock (close) the mechanism when the key is retracted. Reblocking the mechanism may also be performed when the plug is rotated back to the locked position of the cylinder. The electronics can also be used to electrically reblock the blocking mechanism if so desired.

Information Elements

All keys and locks have a unique electronic identity or code comprising several information elements controlling the function of the keys and the locks. The information elements of a key or a lock will now be described with reference to FIGS. 4*a* and 4*b*, respectively.

The electronic code is divided into different segments for the use of manufacturers, distributors and customers. Some public elements are common for devices of a master key system while a secret segment is provided for secret information.

Figure 4A:
FIGS. 4*a* and 4*b* are an overview of electronic information elements of a key and a lock, respectively.

For the present invention, every electronic key code comprises the following relevant parts, see FIG. 4*a:*

Public Key ID (PKID)

Secret Key ID (SKID)

Encryption Key ($K_{DES}$)

Figure 4B:

Correspondingly, every electronic lock code comprises the following parts, see FIG. 4*b:*

Public Lock ID (PLID)

Secret Lock ID (SLID)

Encryption Key ($K_{DES}$)

The basic elements will now be described in more detail.

PKID/PLID—Public Key/Lock Identity

PKID/PLID uniquely identifies a device in a master key system. As the name indicates, this information is public, i.e., there are no extra security measures taken to prevent someone from reading this information.

SKID/SLID—Secret Key/Lock Identity

The secret identity of a device is a randomly generated number that, in the preferred embodiment, is the same for one group of devices. As the name indicates, this information is hidden from the outside, i.e., is non-readable information used internally of a device.

$K_{DES}$—Encryption Key

The $K_{DES}$ comprises a randomly generated encryption key. In the preferred embodiment, the DES encryption algorithm is used, partly because its speed, and preferably the Triple DES (3DES).

In the preferred embodiment, $K_{DES}$ is identical in all devices of a master key system.

$K_{DES}$ is in no way readable from the outside and is used by the algorithms executed internally of the key and lock devices. This is a very important feature as it eliminates the possibility to copy a key just by reading the contents of its memory.

Figure 6:
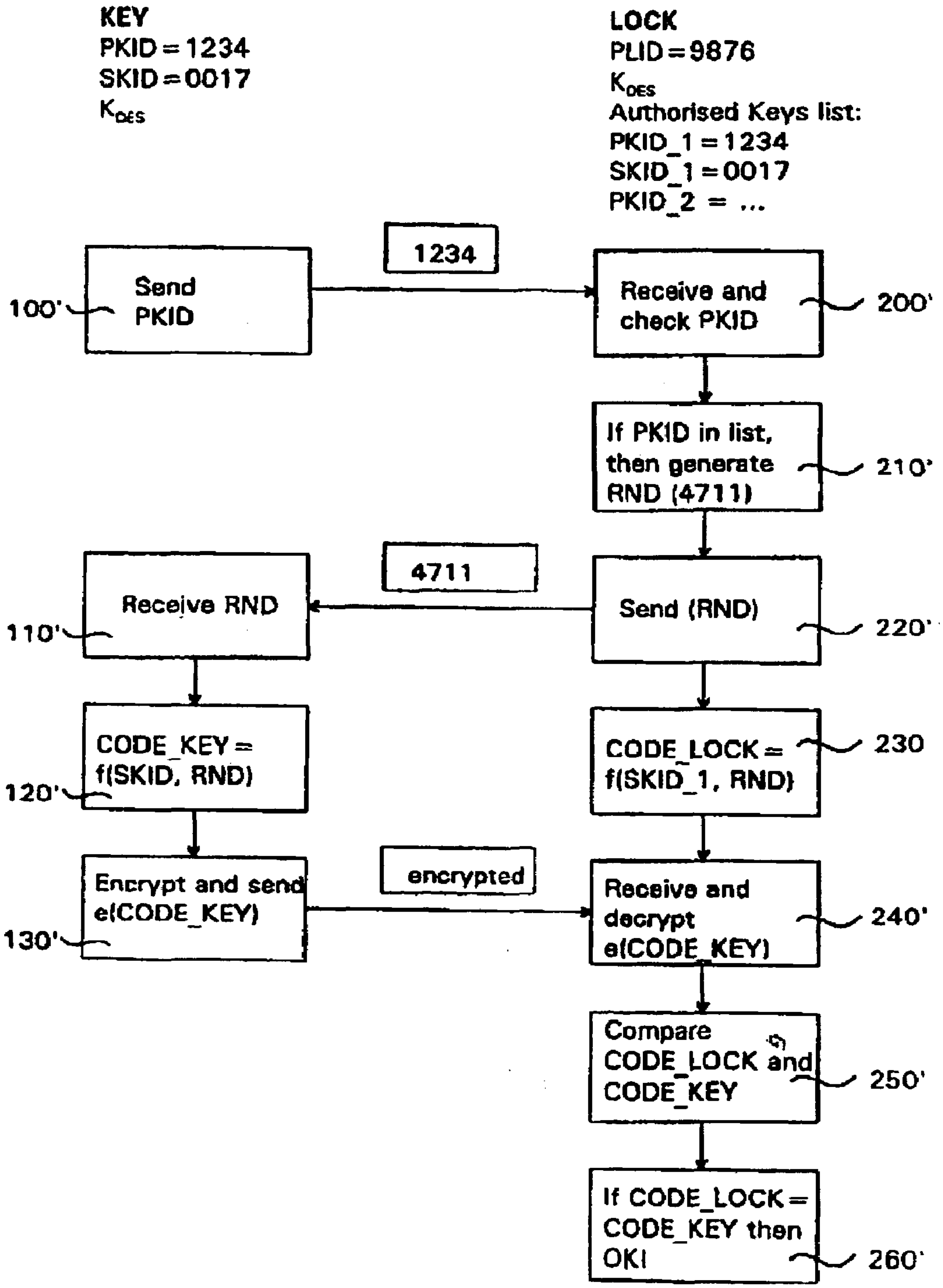
FIG. 6 is a flow chart describing an alternative embodiment of the inventive authentication process.

$K_{DES}$ can used in the authorization processes taking place between different devices, as in the embodiment described with reference to FIG. 6. Thus, for a key to be able to operate a lock, both the key and the lock must have the same $K_{DES}$. Otherwise, the authorization process will fail, as will be described in more detail below.

Authorization Table

In every lock there is an authorization table stored in electronic memory. The authorization table determines which keys are accepted by the lock in question. The configuration and function will now be discussed.

Figure 5:
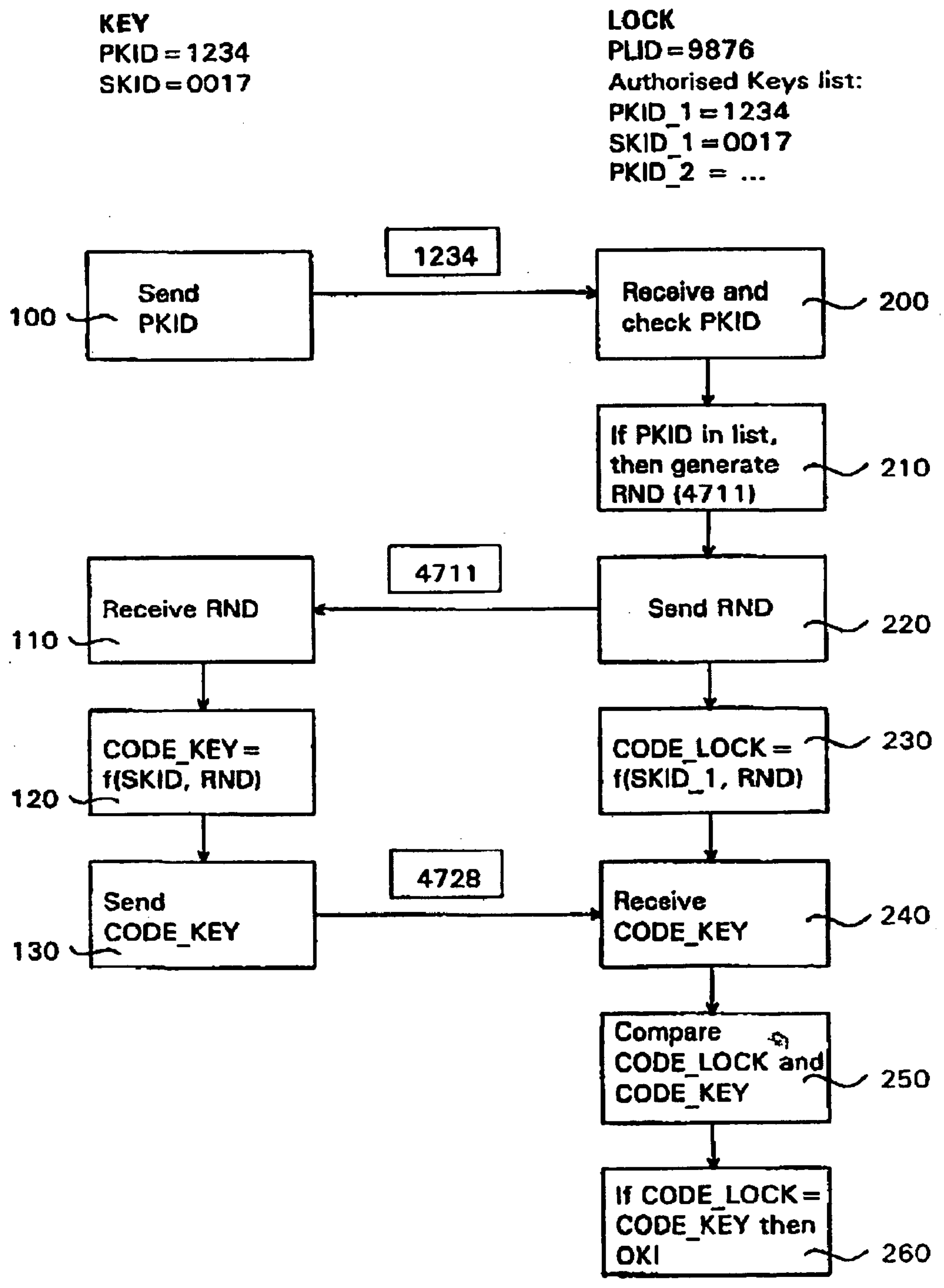
FIG. 5 is a flow chart describing an embodiment of the inventive authentication process.

In its basic form, the authorization table simply lists keys authorized in the lock in question, see FIG. 5 under the heading "LOCK". Thus, for initiating an authentication procedure, the PKID of a key inserted in the lock must be in the list of authorized keys. A key is listed by its unique identity, which is determined by the PKID, as already has been explained.

As already stated, when a key is listed in the authorization table, the corresponding secret key identity SKID for the key in question is stored, too. In the preferred embodiment, the SKID is the same for all keys of one group of keys and is used for security reasons. It is not possible to read the SKID from the keys or locks without having fulfilled special authentication procedures by means of a system key.

Authentication Procedure

In applications, where an authorization table is being stored in the cylinder memory to control access privileges at the door, an identification or authentication procedure is performed. A first, basic procedure will be explained below with reference to FIG. 5, in which steps performed in the key electronics 14 are displayed to the left and steps performed in the lock electronics 24 are displayed to the right. Before the authentication procedure is initiated, the key 10 in question is inserted into the lock 20.

In the present example, the PKID of the inserted key is "1234" and the SKID is "0017". The PLID is "9876". The authorized keys list of the lock contains PLID and SLID for all authorized keys, i.e., PKID_1 and SKID_1 for a first key, PKID_2 and SKID_2 for a second key etc. In the example, data for the first key corresponds to the data for the inserted key.

First, in step 100, the PKID is retrieved from the key memory 17 and is transmitted to the lock electronics 24. In the present case, the information "1234" is transmitted, which is public information. This information is received and processed by the lock electronics 24 in step 200, looking through the authorization table to find out whether the received PKID matches any of the entries in the table. The received PKID matches PKID_1 and the authentication procedure can thus proceed to step 210.

In step 210, the lock electronics generates a random word RND, in the present example "4711". This random word is transmitted to the key electronics in step 220, wherein it is received and processed, step 110. Both the key and the lock electronics now have knowledge of RND and SKID.

In the following steps, 120 for the key and 230 for the lock, code words CODE_KEY and CODE_LOCK, respectively, are calculated. In this simplified example, the code words are calculated as functions of RND and SKID and more specifically as a simple addition of RND and SKID. This gives the following calculation:

RND 4711

SKID 0017 code-word 4728

In step 130, the key electronics sends its calculated code word CODE_KEY, "4728", to the lock, which in step 240 receives and processes the information. In the lock electronics, CODE_KEY and CODE LOCK are then compared in step 250. If CODE_KEY and CODE_LOCK are identical, the authentication procedure is successfully ended and the actuator 40 is moved to a non-blocking position.

Thus, the microprocessors 16 and 26 in the key and the lock, respectively, have a respective code and algorithm.

When the random number is communicated from the lock to the key, a calculation is started in the respective microprocessor 16 and 26. The results of the calculations are compared and if they are identical, the electrical blocking mechanism is enabled by means of the actuator 40.

Thus, the key and lock functions can be expressed in the following way:

Key function (random number, secret)=result (key)

Lock function (random number, secret)=result (cylinder)

If result (key)=result (cylinder) then OK!

In an alternative embodiment of the authentication procedure according to the invention, the above-mentioned encryption key $K_{DES}$ is introduced. The introduction of $K_{DES}$ adds a further level of security. This alternative embodiment will now be described with reference to FIG. 6, in which the steps are numbered as in FIG. 5 but with an additional prime sign.

When the code word CODE_KEY has been generated by the key, this is encrypted, see step 130'. In this encryption, a combination of $K_{DES}$, SKID, and RND are used for the encryption. This provides for a more safe transfer of information between key 10 and lock 20. After having been transferred from the key 10 to the lock 20, the encrypted CODE_KEY is decrypted, using the information $K_{DES}$, SKID_1, and RND stored in the lock, and the comparison proceeds as in the first embodiment in steps 250' and 260'.

Further features can be added to the procedures described above with reference to FIGS. 5 and 6. For example, in step 220, also the PLID can be sent together with RND. This added information can be used in more than one way. Firstly, it could be used for updating an audit trail in the key, i.e., for creating a list of all locks in which the key has been used. Also, there can be a list in the key memory stating all locks with which the key can be used. In case the PLID is not found in that list in the key memory, the authentication procedure is aborted in step 110.

In the described examples, the random number RND has been calculated by the lock electronics. However, it is realized that this calculation also can be performed by the key electronics.

In the described examples, SKID and RND have been used as variables when calculating the code words. It is realized that other information item can be used as well. For example, a list of authorized locks can be stored in the key, with PLID and SLID information items stored in this list. Instead of or additionally to using the SKID for calculating the code words, the SLID can be used. This could be particularly convenient in a system of industry locks, in which there are many locks but few keys.

The described algorithm for calculating the code words has for the sake of clarity and easy understanding been kept unrealistic simple. It is realized that a far more advanced algorithm will be used in practice.

It has been stated that the entire information elements are used for e.g. calculation of the code words. It is realized that also a part of an information element can be used without sacrificing security. On the contrary, if only a part of e.g. a secret identification is used, this could in fact increase the level of security, should a fraudulent person come across the secret identification.

Thanks to the inherent security of a key and lock device according to the invention, any successful attack requires very costly equipment used by very skilled and knowledgeable people. Any such successful attack has no negative influence on the use of systems other than the system or is totally reprogrammed, requiring the same effort for a new successful attack. To ensure such security dual identification/authentication in communication between key and cylinder is provided. In addition, a true random generator can be used further to increase security.

Preferred embodiments of the invention have been described above. The person skilled in the art realizes that the key and lock device according to the invention can be varied without departing from the scope of the invention as defined in the claims. Thus, it should be understood that the memories 17, 18 and 27, 28 and/or the analogue parts 19, 29 could be integrated with the respective processor 16 and 26 or be separate chips, depending on the security requirements etc.

A single battery 13 has been shown in the key. However, with a battery provided in both the key and the lock, there is no need to transfer power via the connectors 15, 25.

The invention claimed is:

1. A key and lock device having a key and a lock, comprising:

a plurality of first devices belonging to a group of first devices, each first device comprising:
- a first electronic processor,
- a first memory connected to said first electronic processor, and
- a first connector connected to said first electronic processor, a second device comprising:
- a second electronic processor,
- a second memory connected to said second electronic processor, and
- a second connector connected to said second electronic processor and adapted to mechanically co-operate with said first connector when said key is inserted in the lock so as to transfer information between said key and lock, and
- a power source connectable to said first and second processors,
- a mechanically operated blocking mechanism operated by a mechanically coded device, and
- an electrically operated blocking mechanism adapted to block operation of the lock when an unauthorized key is inserted in the lock, wherein
  - said first memory is adapted for storing a public identity and a single secret identity, wherein said secret identity is the same for the first devices belonging to the group of first devices,
  - said second memory is adapted for storing the public identity and a secret identity for authorized first devices,
  - said first electronic processor is arranged to identify itself to said second electronic processor by said public identity, and
  - said first and second electronic processors are arranged to exchange a random number and to calculate a respective code word using at least a part of said secret identity and at least a part of said random number, and
  - wherein said electrically operated blocking mechanism is brought to a non-blocking position if said code words calculated in said first and second electronic circuits, respectively, are identical.

2. The key and lock device according to claim 1, wherein said first devices are keys and said second device is a lock.

3. The key and lock device according to claim 1, wherein said first devices are locks and said second device is a key.

4. The key and lock device according to claim 1, wherein said first and second electronic processors are arranged to encrypt said code word before communication thereof.

5. The key and lock device according to claim 4, wherein said code word is encrypted by means of at least a part of a DES encryption key.

6. The key and lock device according to claim 4, wherein said code word is encrypted by means of at least a part of said secret identity.

7. The key and lock device according to claim 4, wherein said code word is encrypted by means of at least a part of said random number.

8. The key and lock device according to claim 4, wherein there is no operation for reading of secret information.

9. The key and lock device according to claim 1, wherein said first and second electronic processors are identical regarding their hardware design.

10. The key and lock device according to claim 1, comprising at least one tamper proof memory.

11. The key and lock device according to claim 10, wherein said secret identity is stored in a tamper proof memory.

12. The key and lock device according to claim 2, wherein said first connector is provided at the end of the key bit of the key.

13. The key and lock device according to claim 2, wherein said first connector is provided on an edge of a grip part of the key to cooperate with a connector on an outer surface of the lock.

14. The key and lock device according to claim 1, wherein the power source is provided in the key.

15. The key and lock device according to claim 1, wherein the power source is provided in the lock.

16. The key and lock device according to claim 1, wherein said first and second connectors are adapted for transferring electrical power.

* * * * *